United States Patent
Kaneko

(10) Patent No.: US 9,182,950 B2
(45) Date of Patent: Nov. 10, 2015

(54) NON-TRANSITORY COMPUTER-READABLE RECORDING MEDIUM STORING USER INTERFACE PROGRAM FOR DEVELOPING APPLICATION SOFTWARE

(71) Applicant: KYOCERA Document Solutions Inc., Osaka (JP)

(72) Inventor: Kotaro Kaneko, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 3 days.

(21) Appl. No.: 14/167,172

(22) Filed: Jan. 29, 2014

(65) Prior Publication Data

US 2014/0215434 A1    Jul. 31, 2014

(30) Foreign Application Priority Data

Jan. 31, 2013    (JP) .................................. 2013-016686

(51) Int. Cl.
*G06F 9/44*    (2006.01)

(52) U.S. Cl.
CPC ........................................ *G06F 8/34* (2013.01)

(58) Field of Classification Search
None
See application file for complete search history.

(56) References Cited

U.S. PATENT DOCUMENTS

| 6,564,375 | B1 * | 5/2003 | Jiang ............................. 717/165 |
| 2004/0143830 | A1 * | 7/2004 | Gupton et al. ................ 717/174 |
| 2004/0255291 | A1 * | 12/2004 | Sierer et al. ................... 717/174 |
| 2004/0260565 | A1 * | 12/2004 | Zimniewicz et al. ............ 705/1 |
| 2006/0005132 | A1 | 1/2006 | Herdeg, III .................. 715/704 |
| 2008/0134152 | A1 * | 6/2008 | Edde et al. .................... 717/135 |
| 2011/0004457 | A1 * | 1/2011 | Haviv et al. .................... 703/21 |
| 2012/0278349 | A1 * | 11/2012 | Bidlack ......................... 707/758 |
| 2014/0047228 | A1 * | 2/2014 | Attar et al. ........................ 713/2 |
| 2014/0237622 | A1 * | 8/2014 | Chang et al. .................... 726/27 |

FOREIGN PATENT DOCUMENTS

JP    2006-018827 A    1/2006

* cited by examiner

*Primary Examiner* — Chameli Das
(74) *Attorney, Agent, or Firm* — Stein IP, LLC

(57) ABSTRACT

A non-transitory computer-readable recording medium that stores a user interface program for developing application software using a graphical user interface (GUI) developing unit configured to cause a user to develop application software via a GUI. The user interface program causes a computer to function as a command-line user interface (CUI)-based GUI control unit configured to control the GUI developing unit via a CUI. The GUI developing unit is configured to operate in response to an input event generated by manipulation of an input device, and the CUI-based GUI control unit is configured to pseudo-generate the input event via the CUI.

3 Claims, 6 Drawing Sheets

```
public class FinishButtonListener implements KeyListener {
    public void keyPressed(KeyEvent e) {

}
    public void keyReleased(KeyEvent e) {

NON-TRANSITORY COMPUTER-READABLE RECORDING MEDIUM STORING USER INTERFACE PROGRAM FOR DEVELOPING APPLICATION SOFTWARE

CROSS-REFERENCE TO RELATED APPLICATION

This application is based upon, and claims the benefit of priority from, corresponding Japanese Patent Application No. 2013-016686 filed in the Japan Patent Office on Jan. 31, 2013, the entire contents of which are incorporated herein by reference.

BACKGROUND

Unless otherwise indicated herein, the description in this section is not prior art to the claims in this application and is not admitted to be prior art by inclusion in this section.

There is a typical application development program for developing an application by a user via a graphical user interface (GUI). This typical application development program can repeat an operation by recording this operation and can execute batch process, using the separately prepared operation recording program.

SUMMARY

The present disclosure relates to a non-transitory computer-readable recording medium that stores a user interface program for developing application software using a graphical user interface (GUI) developing unit configured to cause a user to develop application software via a GUI. The user interface program causes a computer to function as a command-line user interface (CUI)-based GUI control unit configured to control the GUI developing unit via a CUI. The GUI developing unit is configured to operate in response to an input event generated by manipulation of an input device, and the CUI-based GUI control unit is configured to pseudo-generate the input event via the CUI.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

In the accompanying drawings:

FIG. 2 is a chart illustrating one example of a listener corresponding to a finish button as a GUI displayed by a GUI developing unit in the application development apparatus.

DETAILED DESCRIPTION

Figure 1:
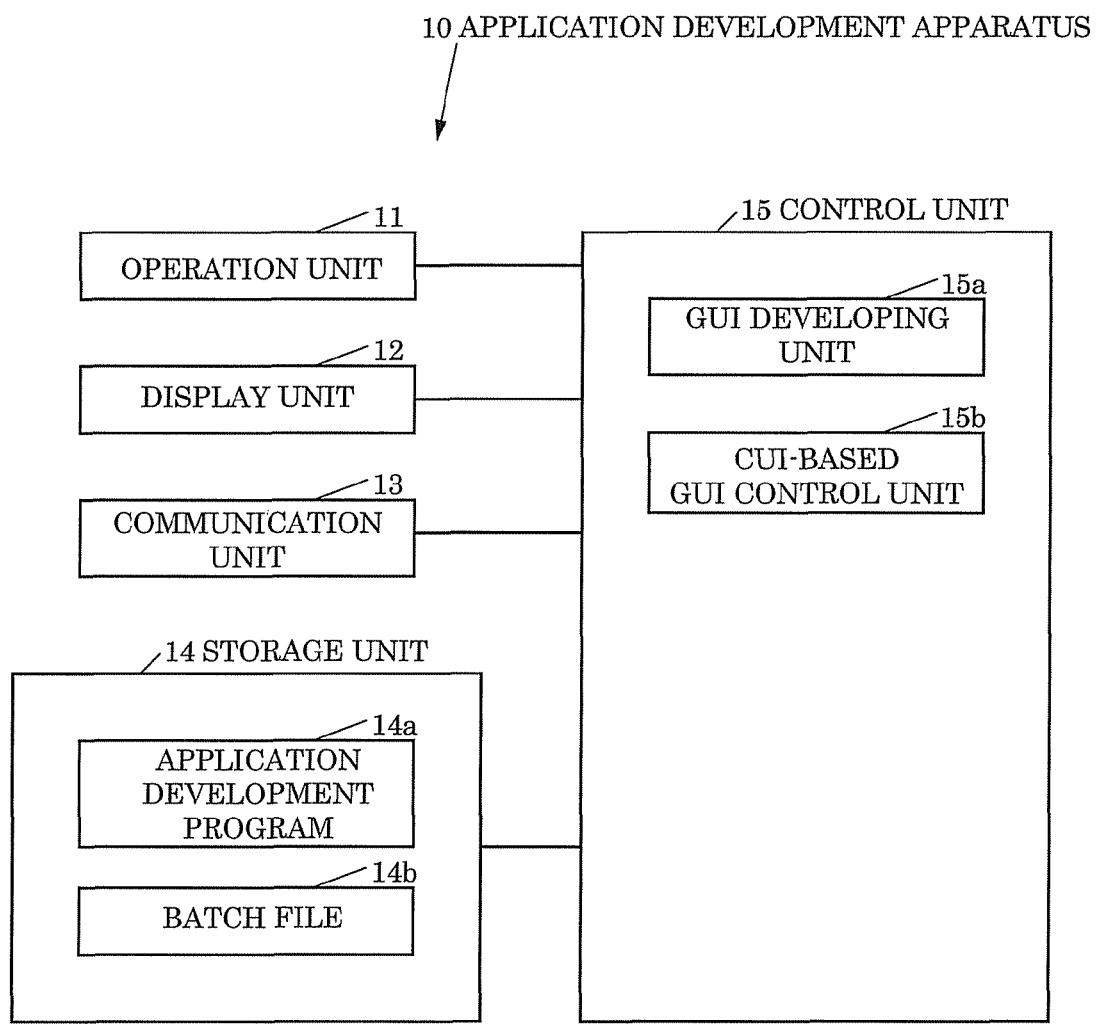
FIG. 1 is a block diagram illustrating an application development apparatus according to one embodiment of the present disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the disclosure, as generally described herein, and illustrated in the drawings, can be arranged, substituted, combined, separated, and designed in a wide variety of different configurations, all of which are explicitly contemplated herein.

Hereinafter, one embodiment of the present disclosure will be described with reference to the drawings.

First, a description will be given of a configuration of an application development apparatus 10 according to this embodiment.

FIG. 1 is a block diagram illustrating the application development apparatus 10 according to this embodiment.

As illustrated in FIG. 1, the application development apparatus 10 includes a manipulation unit 11, a display unit 12, a communication unit 13, a storage unit 14, and a control unit 15. The manipulation unit 11 is an input device such as a computer mouse and a keyboard that receives various manipulations by a user. The display unit 12 is a display device such as a liquid crystal display (LCD) that displays various information. The communication unit 13 is a communication device that communicates with an external device. The storage unit 14 is a non-volatile storage device such as a hard disk drive (HDD) that stores various data. The control unit 15 controls the overall application development apparatus 10. The application development apparatus 10 may be, for example, a computer such as a personal computer (PC).

The application development apparatus 10 is, for example, an apparatus for developing application software for an image forming apparatus such as a multifunction peripheral (MFP), a printer-only machine, a copy-only machine, and a fax-only machine. Alternatively, the application development apparatus 10 is an apparatus for developing application software with a graphical user interface (GUI), for example, application software for a computer such as a PC.

The storage unit 14 stores an application development program 14a executed by the application development apparatus 10. The application development program 14a may be installed on the application development apparatus 10 at production stage of the application development apparatus 10. The application development program 14a may additionally be installed on the application development apparatus 10 from a storage medium such as a compact disk (CD), a digital versatile disk (DVD), and a universal serial bus (USB) memory. Further, the application development program 14a may additionally be installed in the application development apparatus 10 via a network.

The storage unit 14 stores a batch file 14b such as an extensible markup language (XML) file in which information to be used in batch process is stored.

The control unit 15 includes, for example, a central processing unit (CPU), a read only memory (ROM), and a random access memory (RAM). The ROM preliminarily stores a program and various data. The RAM is used as a work area of the CPU. The CPU executes the program stored in the ROM or the storage unit 14.

The control unit 15 executes the application development program 14a stored in the storage unit 14 so as to function as a GUI developing unit 15a and a CUI-based GUI control unit 15b. The GUI developing unit 15a causes the user to develop an application via the GUI. The CUI-based GUI control unit 15b controls the GUI developing unit 15e via a command-line user interface (CUI).

The GUI developing unit 15a operates corresponding to an input event that is an event generated by manipulation of the manipulation unit 11. That is, the GUI developing unit 15a implements a function, which is referred to as a listener or a callback function.

FIG. 2 is a chart illustrating one example of a listener corresponding to a finish button as a GUI displayed by the GUI developing unit 15a.

For example, an ordinary process when the finish button is clicked requires a call of a function as illustrated in FIG. 2. Calling the function as illustrated in FIG. 2 requires an input value that is an instance "e" of a class "KeyEvent", that is, an input event. In other words, pseudo-generating this input event causes the GUI developing unit 15a to execute the process when the finish button is clicked even though the finish button is not actually clicked.

Next, the operation of the application development apparatus 10 will be described.

First, a description will be given of an operation of the application development apparatus 10 in the case where an installation package of the application is created only via the GUI.

Figure 3:
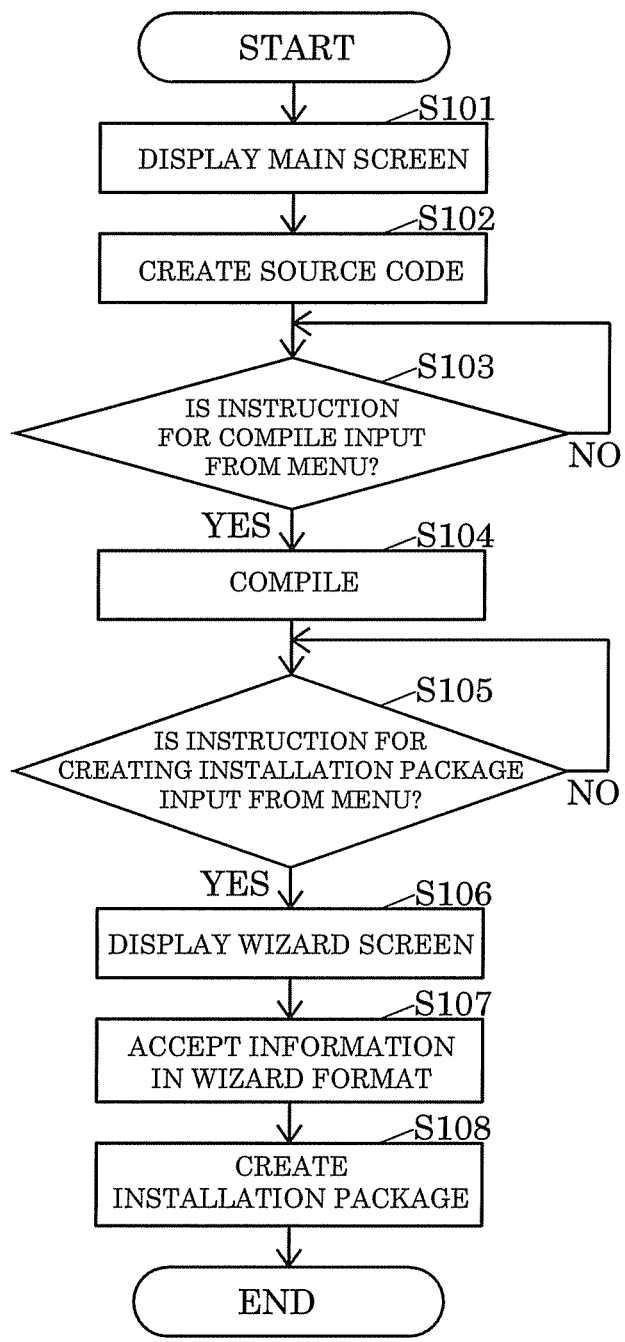
FIG. 3 is a flowchart of an operation of the application development apparatus when a user develops an application via the GUI.
Figure 4:
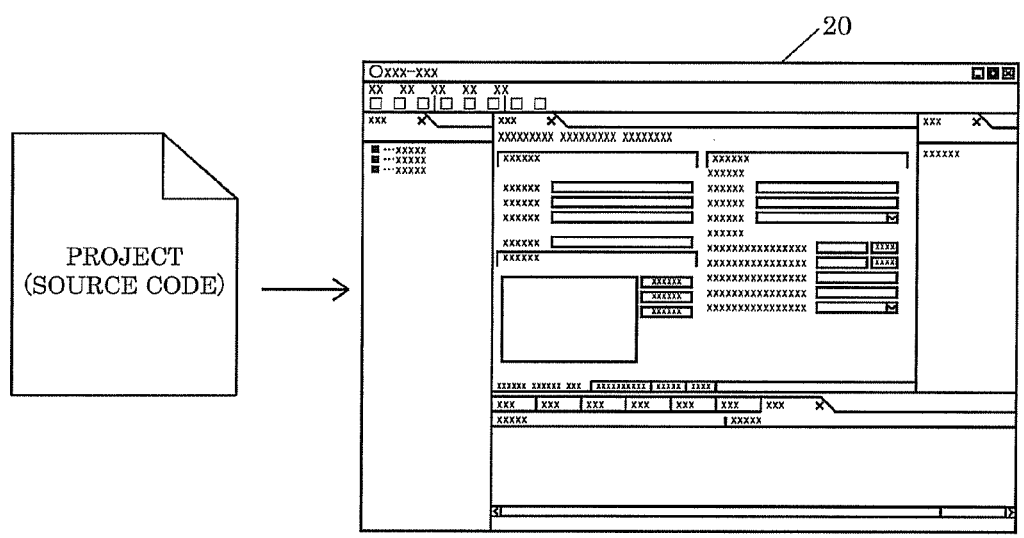
FIG. 4 is a schematic diagram illustrating one example of a main screen activated by the GUI developing unit in the application development apparatus.

FIG. 3 is a flowchart of an operation of the application development apparatus 10 when the user develops an application via the GUI. FIG. 4 is a schematic diagram illustrating one example of a main screen 20 activated by the GUI developing unit 15a.

As illustrated in FIG. 3, in the application development apparatus 10, the GUI developing unit 15a of the control unit 15 displays the main screen 20 (see FIG. 4) on the display unit 12 (in S101).

Subsequently, the GUI developing unit 15a creates a source code of the application software corresponding to an instruction via the manipulation unit 11 (in S102). Here, the GUI developing unit 15a may read out a premade source code from the storage unit 14 in accordance with the instruction via the manipulation unit 11.

Subsequently, in the case where an instruction for compile is input from the menu on the main screen 20 via the manipulation unit 11 (YES in S103), the GUI developing unit 15a compiles the source code generated in S102 (in S104).

Subsequently, in the case where an instruction for creating the installation package is input from the menu on the main screen 20 via the manipulation unit 11 (YES in S105), the GUI developing unit 15a displays a wizard screen 30 (see FIG. 5) via which information required for creating the installation package is input (in S106).

Figure 5:
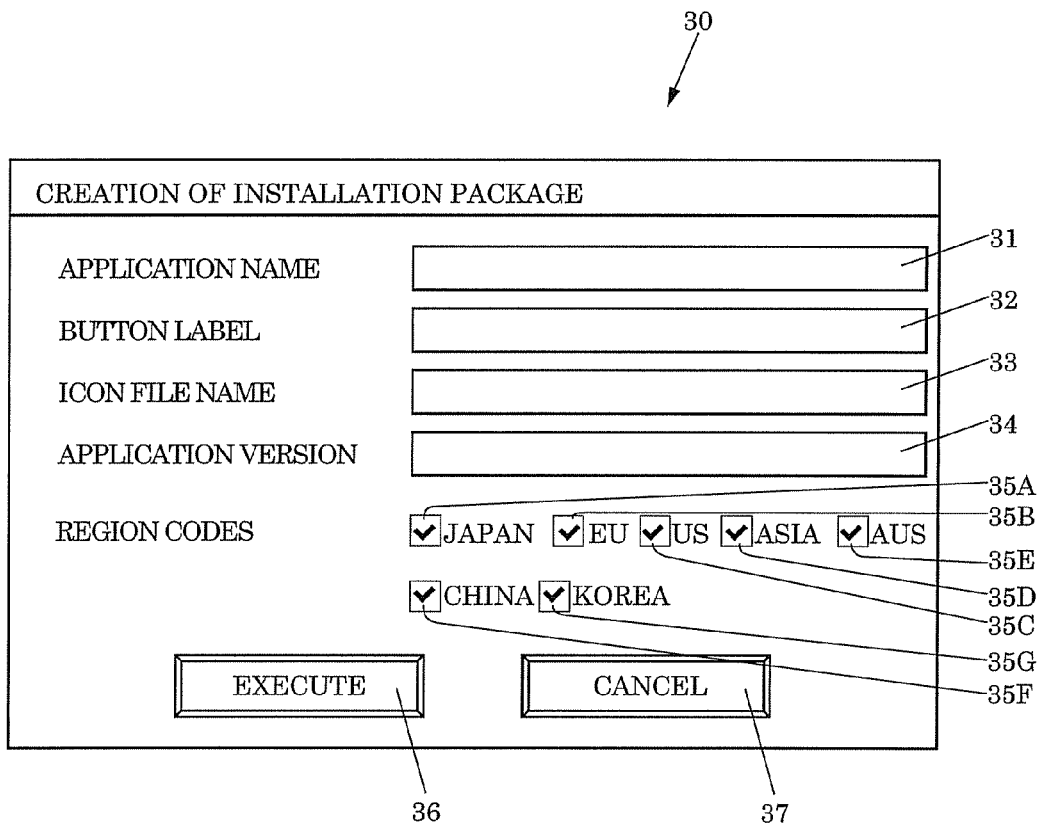
FIG. 5 is a schematic diagram illustrating one example of a wizard screen displayed on a display unit in the application development apparatus.

FIG. 5 is a schematic diagram illustrating one example of the wizard screen 30 displayed on the display unit 12.

In FIG. 5, the wizard screen 30 includes text boxes 31 to 34, check boxes 35a to 35g, and buttons 36 and 37. The text box 31 is an input field for inputting a name of application software. The text box 32 is an input field for inputting a button label of the application software. The text box 33 is an input field for inputting a path to an icon used as the icon of the application software. The text box 34 is an input field for inputting a version of the application software. The check boxes 35a to 35g are input fields for inputting information of a region where the application is sold or used, by selecting operation. The button 36 is a button for instructing execution of creating the installation package. The button 37 is button for instructing stop of creating the installation package.

As illustrated in FIG. 3, the GUI developing unit 15a accepts information in a wizard format (in S107). That is, the GUI developing unit 15a accepts the information input in the text boxes 31 to 34 and the check boxes 35a to 35g at the point when the button 36 on the wizard screen 30 illustrated in FIG. 5 is pressed. The GUI developing unit 15a terminates the operation illustrated in FIG. 3 in the case where the button 37 on the wizard screen 30 illustrated in FIG. 5 is pressed.

The GUI developing unit 15a creates the installation package based on the file compiled in S104 and the information accepted in S107 (in S108), and then terminates the operation illustrated in FIG. 3.

Next, a description will be given of an operation of the application development apparatus 10 in the case where the installation package of the application is created via the GUI using a CUI.

Figure 6:
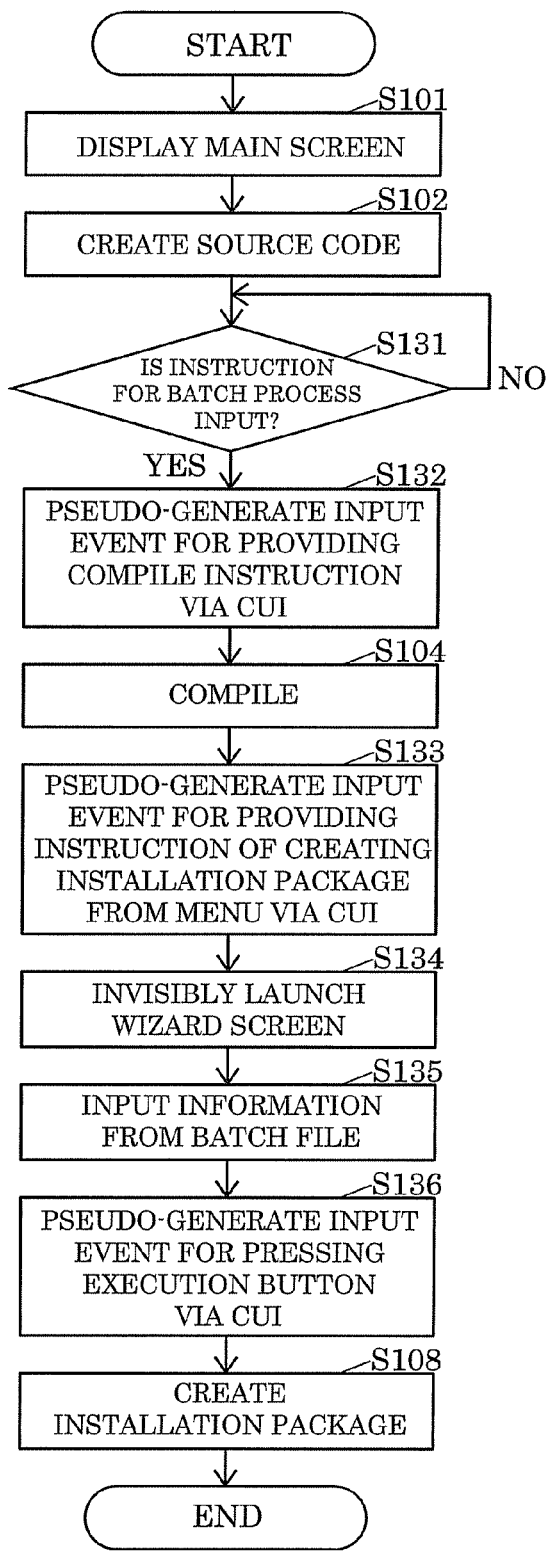
FIG. 6 is a flowchart of an operation of the application development apparatus when an application is developed using a CUI.

FIG. 6 is a flowchart of an operation of the application development apparatus 10 in case of developing the application software using the CUI.

As illustrated in FIG. 6, in the application development apparatus 10, the GUI developing unit 15a of the control unit 15 executes the processes in S101 and S102 similar to FIG. 3.

Subsequently, in the case where the instruction for the batch process is input via the manipulation unit 11 using the CUI (YES in S131), the CUI-based GUI control unit 15b of the control unit 15 pseudo-generates an input event, which is supposed to provide the compile instruction from the menu on the main screen 20, via the CUI (in S132).

Subsequently, the GUI developing unit 15a compiles the source code created in S102, in response to the input event generated in 8132 (in S104).

Subsequently, the CUI-based GUI control unit 15b pseudo-generates the input event, which is supposed to provide the instruction of creating the installation package from the menu on the main screen 20, via the CUI (in S133).

Subsequently, the CUI-based GUI control unit 15b causes the GUI developing unit 15a to invisibly launch the wizard screen 30 illustrated in FIG. 5 (in S134).

Subsequently, the CUI-based GUI control unit 15b inputs, via the CUI, the information from the batch file 14b to variables corresponding to the text boxes 31 to 34 and the check boxes 35a to 35g on the wizard screen 30 invisibly launched in S134 (in S135). Here, the variables corresponding to the text boxes 31 to 34 and the check boxes 35a to 35g on the wizard screen 30 are defined such that the text boxes 31 to 34 and the check boxes 35a to 35g do not have Private attributes, but have Public attributes. This allows write operation from the CUI-based GUI control unit 15b as an external function.

Subsequently, the CUI-based GUI control unit 15b pseudo-generates the input event, which is supposed to press the button 36 as an execution button on the wizard screen 30, via the CUI (in S136).

The GUI developing unit 15a creates the installation package based on the file compiled in S104 and the information input in 8135. in response to the input event generated in S136 (in S108), and then terminates the operation illustrated in FIG. 6.

As described above, the application development program 14a can be realized by using a development environment that causes the user to develop an application via a GUI development program (for example, Microsoft Visual Studio (registered trademark) or Eclipse) only with the addition of a function that controls this development environment via a CUI, for example, using a plug-in program, which functions as a user interface program. This reduces the burden on development of the application development environment compared with conventional techniques. Accordingly, the application development program 14a reduces the burden on development of the application development environment compared with the cases of separately developing a development environment that causes a user to develop an application via a GUI and a development environment that causes a user to develop an application via a CUI.

The application development program 14a pseudo-generates the input event in the GUI via the CUI (in S132, S133, and S136). This automatically realizes an operation corresponding to the input event in the GUI, via the CUI (in S104, S134, and S108).

The application development program 14a inputs the information to the variables corresponding to the text boxes 31 to 34 and the check boxes 35a to 35g, which are the input fields in the GUI, via the CUI (in S135). This automatically realizes the same result as the result in the case where the information is input to the input fields in the GUI, via the CUI.

The application development program 14a hides the wizard screen 30 in the GUI using the CUI (in S134). This reduces uncomfortable feelings for the user due to automatic execution of the control on the wizard screen 30 via the CUI (in S135 and S136).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A non-transitory computer-readable recording medium including one of a compact disk (CD), a digital versatile disk (DVD), and a universal serial bus (USB), that stores an application development program for developing application software using a graphical user interface (GUI) developing unit that causes a user to develop application software via a GUI by an application development apparatus, the application development program causing a computer to function as:

a command-line user interface (CUI)-based GUI control unit that controls the GUI developing unit via a CUI, wherein, if an instruction for a batch process is input using the CUI, the CUI-based GUI control unit pseudo-generates a first input event, which provides a compile instruction from a menu on a main screen of the application development apparatus, via the CUI, wherein the GUI developing unit compiles a source code of the application software in response to the first input event, wherein the CUI-based GUI control unit pseudo-generates a second input event, which provides an instruction of creating an installation package of the application software from the menu on the main screen, via the CUI, wherein the CUI-based GUI control unit causes the GUI developing unit to invisibly launch a wizard screen served as the GUI, wherein the CUI-based GUI control unit inputs, via the CUI, information from a batch file to variables corresponding to a text box and a check box on the wizard screen invisibly launched, the text box and the check box not having Private attributes but having Public attributes, wherein the CUI-based GUI control unit pseudo-generates a third input event, which presses an execution button on the wizard screen, via the CUI, and wherein the GUI developing unit creates the installation package based on a file that the source code is compiled and the information input in response to the third input event.

2. An application development method for causing a user to develop application software by an application development apparatus, comprising:

via the application development apparatus, providing a graphical user interface (GUI) developing unit as a first central processing unit (CPU) in the application development apparatus, which causes a user to develop application software via a GUI; and providing a command-line user interface (CUI)-based GUI control unit as a second CPU in the application development apparatus, which controls the GUI developing unit via a CUI;

wherein, if an instruction for a batch process is input using the CUI, the CUI-based GUI control unit pseudo-generates a first input event, which provides a compile instruction from a menu on a main screen of the application development apparatus, via the CUI, wherein the GUI developing unit compiles a source code of the application software in response to the first input event, wherein an CUI-based GUI control unit pseudo-generates a second input event, which provides the instruction of creating an installation package of the application software from the menu on the main screen, via the CUI, wherein the CUI-based GUI control unit causes the GUI developing unit to invisibly launch a wizard screen served as the GUI, wherein the CUI-based GUI control unit inputs, via the CUI, information from a batch file to variables corresponding to a text box and a check box on the wizard screen invisibly launched, the text box and the check box not having Private attributes but having Public attributes, wherein the CUI-based GUI control unit pseudo-generates a third input event, which presses an execution button on the wizard screen, via the CUI, and wherein the GUI developing unit creates the installation package based on a file that the source code is compiled and the information input in response to the third input event.

3. An application development apparatus for causing a user to develop application software, comprising:

a graphical user interface (GUI) developing unit as a first central processing unit (CPU) in the application development apparatus, which causes a user to develop application software via a GUI; and a command-line user interface (CUI)-based GUI control unit as a second CPU in the application development apparatus, which controls the GUI developing unit via a CUI, wherein, if an instruction for a batch process is input using the CUI, the CUI-based GUI control unit pseudo-generates a first input event, which provides the compile instruction from a menu on a main screen of the application development apparatus, via the CUI wherein the GUI developing unit compiles a source code of the application software in response to the first input event, wherein the CUI-based GUI control unit pseudo-generates a second input event, which provides an instruction of creating an installation package of the application software from the menu on the main screen, via the CUI, wherein the CUI-based GUI control unit causes the GUI developing unit to invisibly launch a wizard screen served as the GUI, wherein the CUI-based GUI control unit inputs, via the CUI, information from a batch file to variables corresponding to a text box and a check box on the wizard screen invisibly launched, the text box and the check box not having Private attributes but having Public attributes, wherein the CUI-based GUI control unit pseudo-generates a third input event, which presses an execution button on the wizard screen, via the CUI, and wherein the GUI developing unit creates the installation package based on a file that the source code is compiled and the information input in response to the third input event.

* * * * *